(12) United States Patent
Iwahashi

(10) Patent No.: US 8,896,299 B2
(45) Date of Patent: Nov. 25, 2014

(54) POSITION DETECTOR DEVICE CAPABLE OF REDUCING THE EFFECT OF EXTERNAL MAGNETIC FIELDS ON PRECISION IN DETECTION

(75) Inventor: Masaru Iwahashi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 13/819,683

(22) PCT Filed: Jul. 19, 2011

(86) PCT No.: PCT/JP2011/066297
§ 371 (c)(1),
(2), (4) Date: Feb. 27, 2013

(87) PCT Pub. No.: WO2012/026243
PCT Pub. Date: Mar. 1, 2012

(65) Prior Publication Data
US 2013/0154623 A1    Jun. 20, 2013

(30) Foreign Application Priority Data

Aug. 27, 2010    (JP) .................................. 2010-190681

(51) Int. Cl.
*G01B 7/30*        (2006.01)
*G01D 3/028*       (2006.01)
*G01D 5/14*        (2006.01)

(52) U.S. Cl.
CPC  *G01B 7/30* (2013.01); *G01D 3/028* (2013.01); *G01D 5/145* (2013.01)
USPC ..................... 324/207.25; 324/207.2; 123/399

(58) Field of Classification Search
CPC .......... G01D 5/145; G01B 7/30; F02D 9/105; F02D 2009/0294

USPC .................................. 324/207.2, 207.25, 174
See application file for complete search history.

(56) References Cited

U.S. PATENT DOCUMENTS

| 6,130,535 | A | 10/2000 | Herden et al. |
| 2006/0081218 | A1* | 4/2006 | Hino et al. ..................... 123/399 |
| 2009/0201014 | A1 | 8/2009 | Cavalo |

FOREIGN PATENT DOCUMENTS

| JP | 9-236403 A | 9/1997 |
| JP | 11-514747 | 12/1999 |

(Continued)

OTHER PUBLICATIONS

International Search Report issued in PCT/JP2011/066297.

(Continued)

*Primary Examiner* — Jay Patidar
(74) *Attorney, Agent, or Firm* — McDermott Will & Emery LLP.

(57) ABSTRACT

Provided is a position detector device capable of suppressing the effect of external magnetic fields on precision in detection. A position detector device (1) comprises: a subject to be detected (4a), which rotates along with the rotation of a handle grip (3) that is disposed on a handlebar (2); a detector unit (5) that detects the subject to be detected (4a); and a case (7) which houses the subject to be detected (4a) and the detector (5). The subject to be detected (4a) is treated as a magnetic cylindrical body, the detector unit (5) is treated as a magnetic detector unit (5) that detects changes in magnetism. A support member (6) rotatably supports the subject to be detected (4a), and further comprises a housing member (65) that houses the detector unit (5) on the interior circumference side of the subject to be detected (4a).

4 Claims, 3 Drawing Sheets

(56) References Cited

FOREIGN PATENT DOCUMENTS

| JP | 2001-124586 A | 5/2001 |
|---|---|---|
| JP | 3079115 U | 8/2001 |
| JP | 2007-185540 A | 7/2007 |
| JP | 2009-543730 | 12/2009 |
| WO | WO-2005108197 A1 | 11/2005 |
| WO | 2005-115824 A1 | 12/2005 |

OTHER PUBLICATIONS

Examination Report issued in Japanese Application No. 2010-190681 dated May 15, 2014.

* cited by examiner

POSITION DETECTOR DEVICE CAPABLE OF REDUCING THE EFFECT OF EXTERNAL MAGNETIC FIELDS ON PRECISION IN DETECTION

RELATED APPLICATIONS

This application is the U.S. National Phase under 35 U.S.C. §371 of International Application No. PCT/JP2011/066297 filed on Jul. 19, 2011, which in turns claims the benefit of Japanese Patent Application No. 2010-190681, filed on Aug. 27, 2010, the disclosures of which Applications are incorporated by reference herein.

TECHNICAL FIELD

The present invention relates to a position detector device which detects an operating position of, for example, a handle grip of a two-wheeled vehicle.

BACKGROUND ART

A related art position detector device is, for example, described in the following Patent Document 1. The position detector device described in Patent Document 1 includes: a pair of plate-shaped magnetic bodies: a pair of magnets which are located between the pair of magnetic bodies and have different magnetic field directions; a rotating member which causes the pair of magnetic bodies and the pair of magnets to rotate in accordance with the operated amount of an operating grip; and a magnetic detector unit which is disposed in an inner side of a closed magnetic circuit formed by the pair of magnetic bodies and the pair of magnets and which detects a change in leakage magnetic field caused inside the closed magnetic circuit when the rotating member causes rotation.

PRIOR ART DOCUMENT

Patent Document

Patent Document 1: Japanese Patent Application Laid-open No. 2007-187540

SUMMARY OF THE INVENTION

Problems to Be Solved By the Invention

However, in the related art position detector device, there has been a problem that the magnetic detector unit is easily influenced by magnetic fields outside of the position detector device and, therefore, precision in detection of the magnetic detector unit is influenced.

In view of the aforementioned problem, an object of the present invention is to provide a position detector device capable of reducing the effect of external magnetic fields on precision in detection.

Means for Solving the Problem

A position detector device of the present invention is a position detector device including: a subject to be detected, which rotates with the rotation of a handle grip disposed in a handlebar; a detector unit which detects the subject to be detected; and a case which houses the subject to be detected and the detector unit, wherein: the subject to be detected is formed as a magnetic cylindrical body; the detector unit is formed as a magnetic detector unit which detects a change in magnetism; and a support member which rotatably supports the subject to be detected and includes a housing member in which the detector unit is disposed is provided in an inner circumference side of the subject to be detected.

The detector unit is formed by a magnetic detector element which is surface-mounted on a circuit board.

The subject to be detected is held by a holder member and the holder member is rotatably disposed in the support member.

The subject to be detected is formed by a magnet and is cylindrical in shape.

EFFECT OF THE INVENTION

As described above, according to the present invention, a position detector device capable of reducing the effect of external magnetic fields on precision in detection can be provided.

BEST MODES FOR CARRYING OUT THE INVENTION

Figure 1:
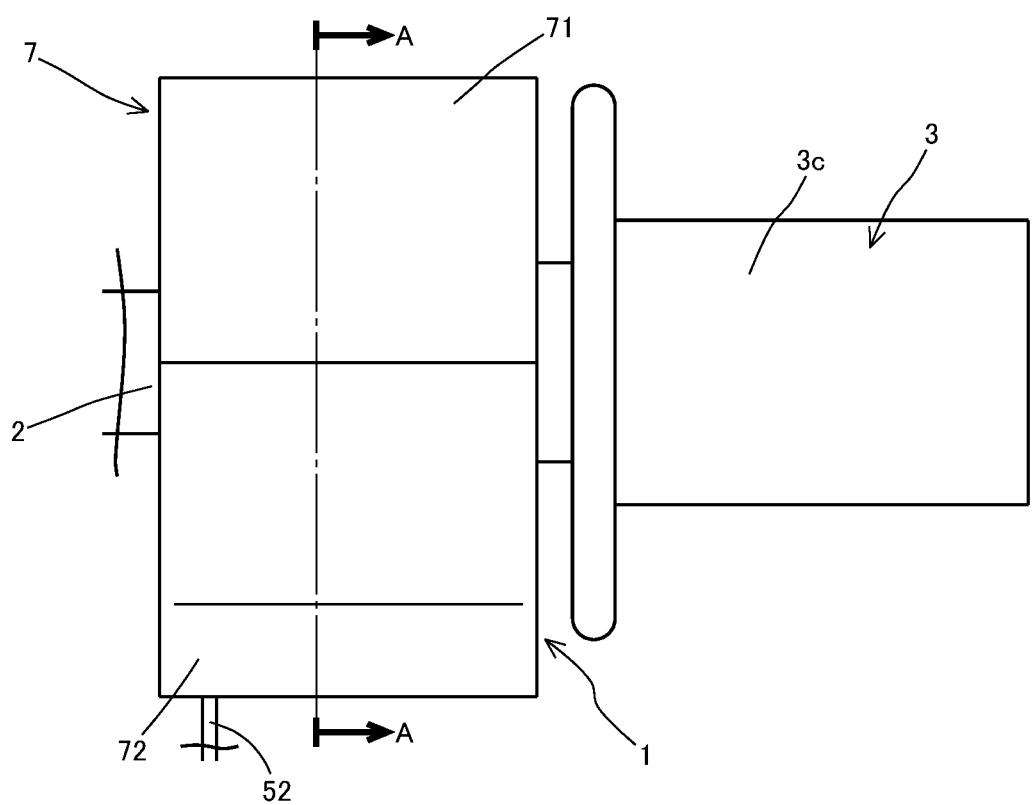
FIG. 1 is a side view of a position detector device of a first embodiment of the present invention.
Figure 2:
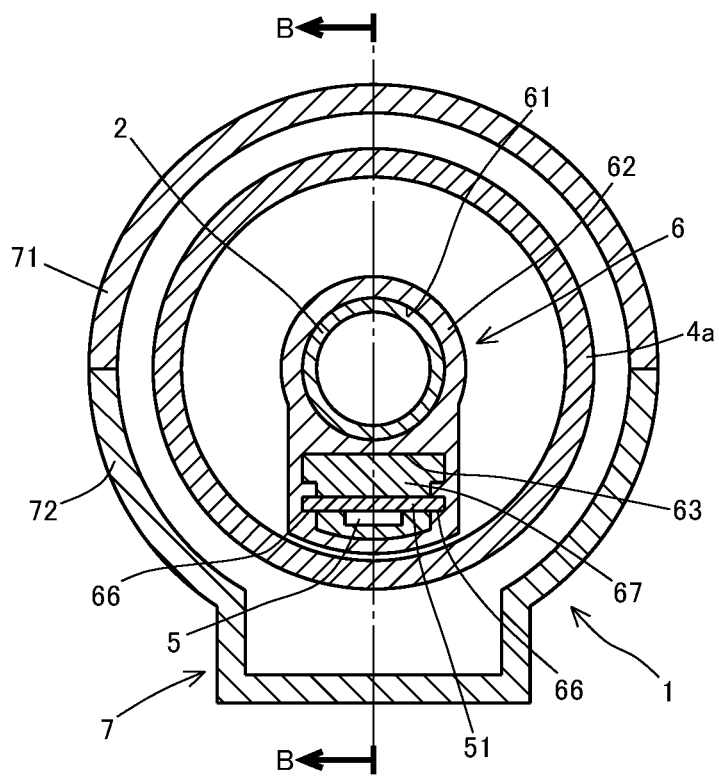
FIG. 2 is a cross-sectional view along line A-A of FIG. 1.

Hereinafter, a first embodiment of the present invention will be described with reference to the accompanying drawings. A position detector device which is rotatably disposed in a handlebar of a two-wheeled vehicle for detecting an operating position (i.e., a rotating angle) of a handle grip will be exemplified as the first embodiment.

A position detector device 1 of the present invention is disposed in a handlebar 2 of a two-wheeled vehicle. The position detector device 1 includes a holder member 4 which is rotated together with a handle grip 3 which is an operating means, a subject to be detected 4a which is fixed to this holder member 4, a detector unit 5 which detects the subject to be detected 4a, a support member 6 which rotatably supports the holder member 4 and to which the detector unit 5 is fixed, and a case 7 in which the holder member 4, the subject to be detected 4a, the detector unit 5 and the support member 6 are housed.

The handlebar 2 is made of metal, such as iron and aluminum, and is cylindrical in shape.

The handle grip 3 is constituted by a sleeve 3a and a grip portion 3b. The sleeve 3a is made of synthetic resin, is cylindrical in shape, and is rotatably disposed in an outer periphery of the handlebar 2. The sleeve 3a includes a flange 3c at a left end in FIG. 3. The flange 3c is formed in a disc shape and is provided seamlessly in an outer periphery of the handle grip 3. The flange 3c includes a connecting portion 3d at a part of an edge thereof. The flange 3d is connected to the holder member 4 at the connecting portion 3d and transmits the rotation of the handle grip 3.

The grip portion 3b, which is a portion grasped by a rider, is made of an elastic member, such as rubber. The grip portion 3b seamlessly covers the outer periphery of the sleeve 3a and is firmly fixed to the sleeve 3a.

The holder member 4 is made of synthetic resin and is circular in shape. The holder member 4 includes a hole 41 through which the support member 6 penetrates. The holder member is rotatably supported by the support member 6. The holder member 4 includes a receiving portion 42 which is formed by a recess in which the connecting portion 3d of the handle grip 3 is inserted. By inserting the connecting portion 3d of the handle grip 3 in the receiving portion 42, rotation of the handle grip 3 is transmitted to the holder member 4 and the holder member 4 is rotated.

The holder member 4 also includes a housing recess 43 in which a later-described return spring 8 is housed. This housing recess 43 is constituted by a cylindrical first tubular portion 44 which forms the hole 41, a cylindrical second tubular portion 45 which is larger in diameter than this first tubular portion 44, and a connecting portion 46 which connects the first and second tubular portions 44 and 45 to each other. The connecting portion 46 is connected on the right side of the first and second tubular portions 44 and 45 in FIG. 3. The housing recess 43 opens on the left side in FIG. 3.

The subject to be detected 4a is a magnetic cylindrical body and is formed by a magnet in the present embodiment. The subject to be detected 4a is fixed to the holder member 4 and, in the present embodiment, is fixed on the left side of the second tubular portion 45 of the holder member 4 in FIG. 3.

The detector unit 5 converts a change in magnetic flux density into an electrical signal and is, for example, a magnetic detector element, such as a Hall element. Two detector units 5 are provided, which are disposed inside the cylinder of the subject to be detected 4a, and detect the position of the subject to be detected 4a.

The detector units 5 are surface-mounted on the circuit board 51. The circuit board 51 includes an unillustrated electrically conducting path and electronic parts which are electrically connected to the electrically conducting path on an insulating substrate of glass epoxy resin. Wiring 52 connected to an external circuit is electrically connected to the circuit board 51. Signals of the detector units 5 are output to the external circuit via the circuit board 51 and the wiring 52.

The support member 6 is made of synthetic resin and is circular in shape. The support member 6 includes a cylindrical tubular portion 62 provided with a hole 61 through which the handlebar 2 penetrates. The support member 6 surrounds the outer periphery of the handlebar 2. The support member 6 is fixed to the handlebar 2 by an unillustrated means so as not to rotate. The support member 6 rotatably supports the holder member 4 by the tubular portion 62.

Figure 3:
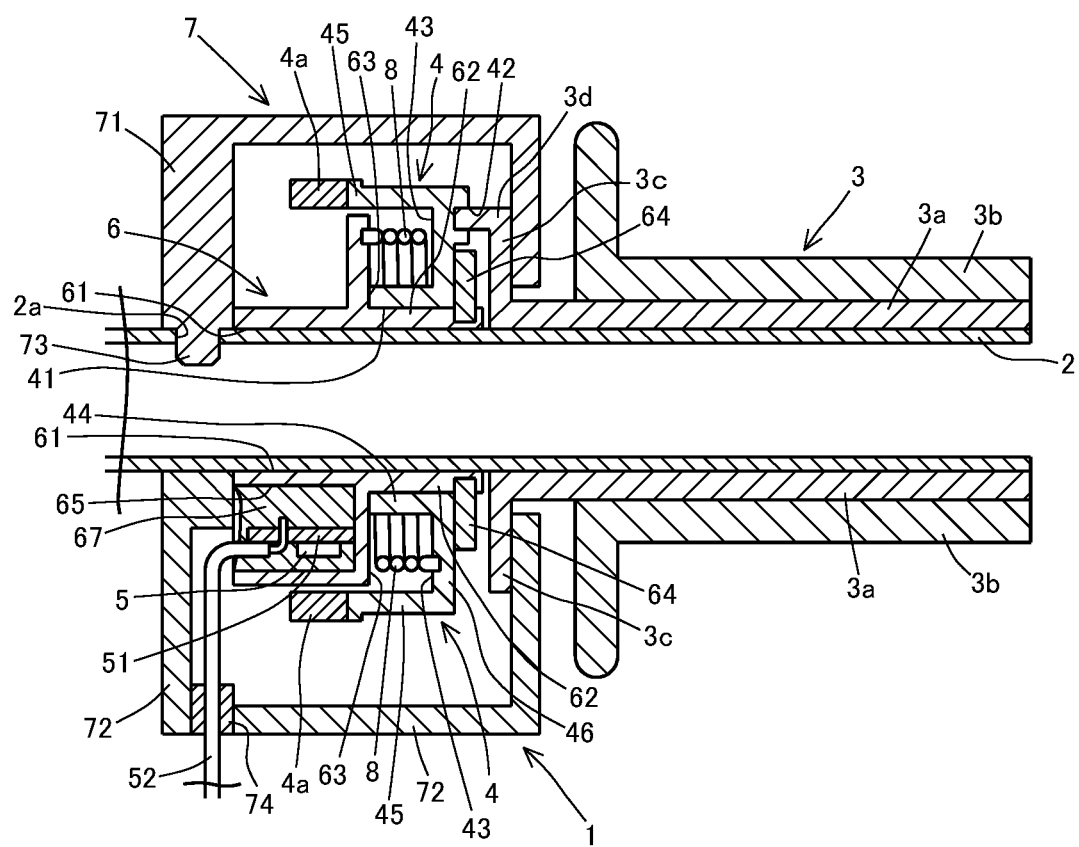
FIG. 3 is a cross-sectional view along line B-B of FIG. 2.

The support member 6 includes a disc-shaped movement restriction unit 63 at a position in the middle of the tubular portion 62 in FIG. 3. This movement restriction unit 63 restricts the movement of the holder member 4 to the left along the rotating shaft direction of the handle grip 3 in FIG. 3.

A slip-off stop member 64 is attached to the support member 6 on the right side of the tubular portion 62 in FIG. 3. The slip-off stop member 64 prevents slipping-off of the holder member 4 from the tubular portion 62 and restricts the movement of the holder member 4 to the right along the rotating shaft direction of the handle grip 3 in FIG. 3.

The support member 6 includes a housing member 65 disposed at a lower left side of the movement restriction unit 63. The detector units 5 and the circuit board 51 are disposed in the housing member 65. This housing member 65 is formed by a recessed portion which opens on the left side in FIG. 3. The housing member 65 includes a holding unit 66 for holding both ends of the circuit board 51. This holding unit 66 is formed by a groove provided on an inner wall of the housing member 65. Inside of this housing member 65 is filled with a protective material 67 which is curable synthetic resin. Therefore, the detector units 5 and the circuit board 51 are protected from, for example, moisture and dust.

The case 7 is constituted by a first case 71 and a second case 72. The first case 71 and the second case 72 are made of synthetic resin and are each shaped as a substantially semicircular cup. The first case 71 and the second case 72 are divided along a direction of the rotation center axis of the handle grip 3. The first case 71 and the second case 72 are fixed by a suitable means, such as welding.

The case 7 houses the holder member 4, the subject to be detected 4a, the detector units 5 and the support member 6. The case 7 includes a pin 73. This pin 73 is inserted in a through hole 2a, provided in the handlebar 2, to fix the case 7 to the handlebar 2 so that the case 7 is not move with respect to the handlebar 2.

The reference numeral 74 denotes a packing. The wiring 52 of the detector units 5 penetrates the packing 74. The packing 74 prevents water and dust from entering the case 7 from the wiring 52.

The reference numeral 8 denotes a return spring which is formed by a coil spring. The return spring 8 is for returning the handle grip 3 operated by the rider to the initial position. One end of this return spring 8 is fixed to the connecting portion 46 of the holder member 4 and the other end is fixed to the movement restriction unit 63 of the support member 6.

As described above, since the subject to be detected 4a is formed as a magnetic cylindrical body and the support member 6 including the housing member 65 in which the detector units 5 are disposed is provided in an inner circumference side of the subject to be detected 4a, the detector unit 5 is not easily influenced by magnetic fields outside of the position detector device 1 and, therefore, it is possible to reduce the influence of precision in detection on the detector units 5 by the external magnetic fields.

Further, since the detector units 5 are formed as the magnetic detector elements which are surface-mounted on the circuit board 51, an operation to insert the circuit board 51 on which the detector units 5 are mounted in the housing member 65 of the support member 6 is easy, whereby workability improves.

Further, since the subject to be detected 4a is held by the holder member 4 and the holder member 4 is rotatably disposed in the support member 6, phase error (i.e., variation) of due to rotation of the holder member 4 can be reduced and precision in detection of the detector unit 5 can be improved.

Although the subject to be detected 4a is formed only by a magnet and is cylindrical in shape in the present embodiment, the present embodiment is not restrictive. A part of the cylindrically-shaped subject to be detected may be formed by two magnets and the two magnets may be connected by a magnetic material, such as iron.

Although the detector units 5 are the magnetic detector elements which are surface-mounted on the circuit board 51 in the present embodiment, the present embodiment is not restrictive. The detector unit 5 may be a magnetic detector element which includes a lead terminal. The lead terminal may be electrically connected to the circuit board 51 by soldering.

Industrial Applicability

The present invention is applicable to a position detector device which detects an operating position of an operating means, such as a handle grip of a two-wheeled vehicle.

DESCRIPTION OF REFERENCE NUMERALS 1 position detector device
2 handlebar
3 handle grip
4 holder member 4a subject to be detected
5 detector member
6 support member
7 case
51 circuit board
65 housing unit
71 first case
72 second case

The invention claimed is:

1. A position detector device comprising:
a subject to be detected, which rotates with the rotation of a handle grip disposed in a handlebar;
a detector unit configured to detect the subject;
a case configured to house the subject and the detector unit, wherein:
the subject includes a magnetic cylindrical body; and
the detector unit includes a magnetic detector unit configured to detect a change in magnetism;
a support member configured to rotatably support the subject and to include a housing member in which the detector unit is disposed, the support member being provided in an inner circumference side of the subject to be detected; and
a holder member configured to hold the subject, wherein
the support member includes a tubular portion and is configured to rotatably support the holder member by the tubular portion.

2. The position detector device according to claim 1, wherein the detector unit includes a magnetic detector element which is surface-mounted on a circuit board.

3. The position detector device according to claim 1, wherein the holder member is rotatably disposed on the support member.

4. The position detector device according to claim 3, wherein the subject includes a magnet and is cylindrical in shape.

* * * * *